Jan. 7, 1941.   C. P. SWEENY   2,227,468
VARIABLE VOLTAGE TRANSFORMER
Filed Aug. 31, 1938
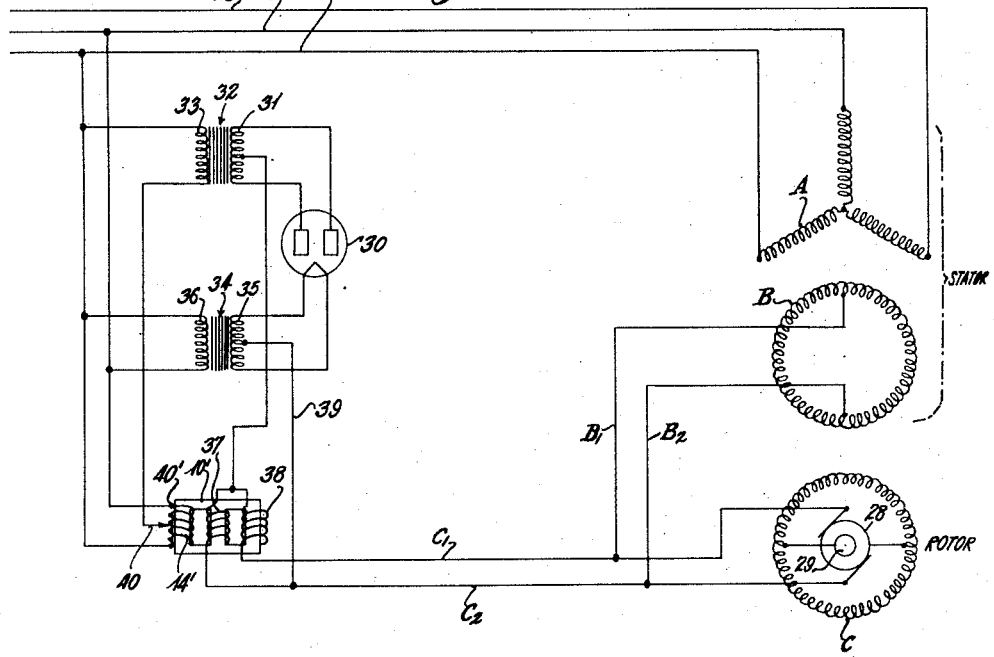
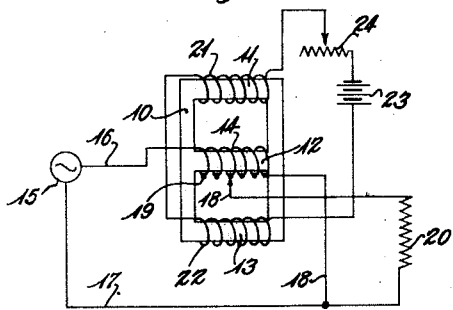
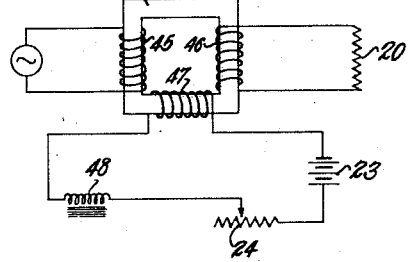
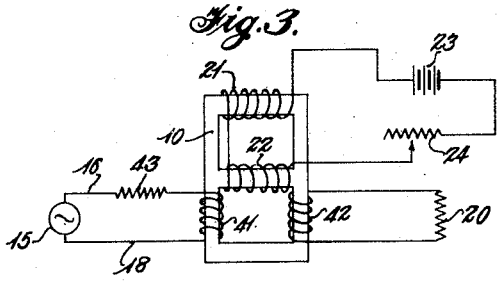
Inventor
Charles P. Sweeny
By Bacon & Thomas
Attorneys Patented Jan. 7, 1941

2,227,468

UNITED STATES PATENT OFFICE 2,227,468

VARIABLE VOLTAGE TRANSFORMER

Charles P. Sweeny, Detroit, Mich., assignor to Vickers Incorporated, Detroit, Mich., a corporation of Michigan Application August 31, 1938, Serial No. 227,827

4 Claims. (Cl. 172—274)

This invention relates to variable voltage transformers, and more particularly to transformers in which the output voltage can be varied by varying the saturation of the core thereof.

An object of the present invention is to provide a transformer having means for varying the saturation of the core of the transformer in order to vary the output voltage.

Another object of the invention is to provide a transformer having supplemental windings upon the core thereof, which windings can be energized to vary the saturation of the core of the transformer and thereby vary the output voltage.

A further object of the invention is to provide a variable voltage transformer responsive to changes in frequency or amount of current flowing in a control winding upon the core of the transformer.

A still further object of the invention is to provide a system in which a transformer in which the output voltage depends upon the frequency of current flowing in a control winding upon the core of the transformer is employed to stabilize the speed of a variable speed electric motor.

Other objects and advantages of the invention will appear in the following description of preferred embodiments of the invention shown in the attached drawing, in which:

Figure 1 is a diagrammatic view of a system employing a transformer of the present invention;

Fig. 2 is a diagrammatic view of a modified transformer of the present invention;

Fig. 3 is a view similar to Fig. 2 of a further modified transformer; and

Fig. 4 is a view similar to Fig. 2 showing a still further modified form of transformer.

Referring to Fig. 2, the transformer of the present invention may comprise a core 10 having a plurality of legs 11, 12 and 13. In the modification shown, a tapped auto-transformer winding 14 may be positioned upon one of the legs, for example leg 12 of the core 10, and have the primary portions thereof supplied from any suitable source 15 of alternating current power through the conductors 16 and 17. A slider 18 is movable along the taps 19 of the winding 14 so as to provide for major variations in voltage across the load shown as a resistance 20 which is connected across the secondary portion of the auto-transformer winding, that is, between the slider 18 and the conductor 17. Control winding comprising coils 21 and 22 may be positioned upon the legs 11 and 13 of the transformer and be connected to a source of direct current, shown as a battery 23 through a variable resistor 24.

The transformer flux produced by the winding 14 threads the coils 21 and 22 to induce voltages therein. The coils 21 and 22 are preferably connected so that the voltages induced by this flux oppose each other so as to prevent any substantial alternating current voltages appearing in the control circuit, including battery 23 and resistor 24. When the coils 21 and 22 are thus connected and are energized from the source of direct current 23, a direct current flux is set up in the core 10 which increases the saturation thereof. If the winding 14 has a relatively few number of turns such that the core 10 is normally operated at relatively high saturation, any increase in saturation of the core due to the direct current energization will increase the reluctance to the alternating current flux and cause increased amounts of leakage flux. This leakage flux will not cut all of the turns of the winding 14 so that the effective voltage, that is to say, the root mean square value of the voltage across the load 20 decreases as direct current energization is increased even though the voltage across the source of alternating current power 15 remains constant. By varying the resistance of the variable resistor 24 in series with the control circuit, the effective voltage across the load 20 can be varied through quite wide limits without changing the position of the slider 18.

It is, of course, understood that any other suitable source of variable voltage direct current can be employed instead of the battery 23 and resistor 24. In fact, a variable voltage alternating current can be employed in the control circuit including the coils 21 and 22 to produce substantially the same result and such current may be of the same or different frequency from that of the source 15. The transformer can also be employed to vary the effective voltage across the load 20 in response to varying frequency of current in the control circuit. As the coils 21 and 22 have inductive reactance, the amount of current flowing through the coils 21 and 22 will decrease with increase of frequency of the control voltage even if the control voltage remains constant.

Advantage is taken of this characteristic of the transformer in the system shown in Figure 1. In this system, A is intended to represent a polyphase multipolar distributed winding of a variable speed electric motor also provided with a multipolar direct current winding B upon the same member, which may be the stator as shown in Fig. 1. C represents a bipolar direct current winding upon the rotor of the motor. When the winding A is energized from a polyphase source of alternating current power through the conductors 25, 26 and 27, a rotating field is set up in the iron of the motor, the speed of rotation of which depends upon the number of poles of the winding A. The winding B, when energized with direct current as hereinafter explained, sets up a stationary multipolar field. Winding B is preferably positioned with respect to the winding A such that no resultant voltages are produced therein from the rotating field of winding A when winding A only is energized, as is disclosed in my copending application Serial No. 72,632, filed April 3, 1936, of which this application constitutes a continuation in part.

Direct current energization of winding C, which is provided with slip rings 28 and 29, also sets up a direct current field which is stationary with respect to the member upon which the winding C is positioned. Direct current energization of the windings B and C may be effected by employing a rectifying tube 30, the plate voltage of which is furnished through a center tapped winding 31 on the transformer 32. The primary 33 of the transformer 32 is supplied from one phase of the alternating current source of power through the auto-transformer winding 14' upon the core 10' of a variable voltage transformer similar to that disclosed in Fig. 2. A filament transformer 34 is provided for heating the filament of the tube 30 and includes a center tapped secondary winding 35 and a primary winding 36. Control windings 37 and 38 are positioned upon the other two legs of the core 10'. The circuit furnishing direct current power to the winding C can be traced from the center tap of the plate voltage transformer winding 31 through the tube 30 to the filament transformer secondary 35, thence from the center tap thereof through the conductor 39, conductor C₂, then back through the conductor C₁, control coil 38 to the center tap of the winding 31 of the transformer 32. The winding B is connected in parallel with the winding C by means of the conductors B₁ and B₂. It will be noted that the coil 37 on the transformer core 10' is connected directly across the source of direct current power since the conductor 39 is connected to the conductor C₂. This winding preferably is of relatively high resistance and contains a relatively large number of turns so as to limit the current flowing therethrough. The amount of current flowing therethrough predetermines the normal saturation of the core 10'. It will be noted that the coils 38 and 37 are connected in series with the windings B and C, so that any voltages appearing across the windings B and C cause current to flow through the coils 37 and 38.

As explained in my copending application above referred to, increase of the direct current energization of windings B and C causes a decrease in the speed of the motor. Variations in speed are accomplished by varying the position of the slider 40 along the taps 41 of the auto-transformer winding 14'. Varying the position of the slider 40 varies the plate voltage applied to the tube 30 and therefore the voltage of the direct current energization of the windings B and C. The speed range of such a motor is extremely wide, but at extremely low speeds the motor tends to become somewhat unstable, that is, the speed varies considerably with variation in load upon the motor. In accordance with the present invention the frequency of voltages appearing across the windings B and C are employed to vary the saturation of the core 10' of the variable voltage transformer so as to vary the plate voltage applied to the tube 30 and therefore the direct current energization of the windings B and C to maintain the speed of the motor substantially constant under varying loads even at low speeds.

It has been found that at low speeds the predominant voltages appearing across the windings B and C are due to the conductors of each winding B and C cutting the direct current field of the other winding. Thus the frequency of these voltages decreases with decrease in speed. As the windings 37 and 38 upon the core 10' of the variable voltage transformer have inductive reactance, a decrease in frequency of the voltages appearing across the windings B and C due to a decrease in speed of the motor causes more current to flow through the windings 37 and 38 so that the saturation of the core 10' is increased. This results in a greater leakage flux, decreasing the effective voltage across the primary 33 of the plate voltage transformer 32, which in turn decreases the plate voltage of the tube 30 to decrease the direct current energization of the windings B and C. As stated before, a decrease in the direct current energization increases the speed of the motor to compensate for the tendency of the motor to decrease its speed under load so that the motor maintains substantially constant speed under varying loads.

In Fig. 3 is shown another modification of a variable voltage transformer in which a separate primary winding 41 and a separate secondary winding 42 is employed. The primary and secondary windings 41 and 42 may be spaced as shown to increase the leakage flux, when the saturation of the core 10 is increased by increasing the direct current energization of the windings 21 and 22, so as to produce a greater variation in voltage across the load 20 when the current in the coils 21 and 22 is varied. A resistance or other impedance 43 inserted, for example, in the conductor 16 between the source of alternating current power 15 and the primary 41 will also increase the proportionate voltage variation across the load 20 when the energization of the coils 21 and 22 is varied. As the leakage flux within the primary winding 41 is increased with increased saturation of the core 10, the amount of current necessary to supply sufficient flux to produce a back voltage equal to the source 15 will be increased. The impedance drop through the impedance 43 will therefore be increased such that a lower effective voltage is applied across the primary 41 to still further reduce the voltage appearing across the load 20. It will be appreciated that an impedance 43 may be employed in the primary circuit of any of the transformers disclosed in order to increase the proportionate control of the voltage across the load.

A still further modification of the variable voltage transformer is shown in Fig. 4. In this figure a conventional transformer 44 is shown upon which relatively widely spaced primary and secondary windings 45 and 46, respectively, are positioned. A single control winding 47 is shown for varying the saturation of the core 44. It will be noted that the alternating current flux in the core 44 will induce voltages in the control winding 47 such that the transformer of Fig. 4 is not suitable for use where alternating current voltages in the control circuit would be deleterious.

Alternating currents in the control circuit can, however, be largely eliminated by employing a large inductance 48 in the control circuit.

Variable voltage transformers and systems herein described are capable of general application and may be employed wherever it is desired to vary an alternating current effective voltage in response to amount of current or frequency of current flowing within the control circuit. It will be appreciated that the present systems may be applied to polyphase circuits as well as single phase circuits. The systems herein disclosed are distinguished from conventional reactor circuits particularly in the fact that the effective voltage across the load is decreased with increase of control current, whereas in reactor circuits the effective voltage across the load is increased with increase of control current.

While I have disclosed the preferred embodiments of my invention, it is understood that the details thereof may be varied within the scope of the following claims.

I claim:

1. In a system for varying the output effective voltage of a transformer, a core having a transformer winding positioned thereon, a source of alternating current power connected to said transformer winding for establishing an alternating current flux in said core, said transformer winding having a plurality of taps connected to intermediate portions thereof, a slider adapted to successively contact said taps, a load connected between said slider and one side of said winding, a control winding positioned upon said core, a source of variable current connected to said control winding, means for varying the amount of said variable current for varying the saturation of said core whereby the effective voltage across said load is decreased as the amount of said variable current is increased.

2. In a system for varying the output effective voltage of a transformer, a core having a transformer winding positioned thereon, a source of alternating current connected across at least a portion of said winding for establishing an alternating current flux in said core, a load connected across at least a portion of said winding, a control winding positioned upon said core and having a plurality of coils connected to prevent any substantial resulting alternating current voltages being induced in said second winding by said alternating current flux, a source of variable current connected to said control winding for varying the saturation of said core, and means for varying the amount of said variable current whereby the effective voltage applied to said load is decreased as said variable current is increased.

3. A system for stabilizing the operation of a variable speed alternating current induction motor of the type having a winding energized from a source of alternating current to produce a rotating field and in which a control winding energized by direct current is employed to decrease the speed of the motor as the direct current energization is increased and alternating current voltages of decreasing frequency are induced in said winding as the speed decreases, said system including a source of alternating current power, a rectifying device for supplying said direct current, a transformer having a primary winding thereon connected to said source of alternating current power, a secondary winding surrounding the entire flux path provided by said core through said primary winding and connected to said rectifying device for supplying alternating current power thereto, and a control winding providing an inductive circuit connected to said control winding of said motor so that currents caused by the alternating current voltages induced in said control winding of said motor flow through said control winding of said transformer, whereby decreased frequency of the voltage induced in said control winding of said motor causes increased current to flow through said control winding of said transformer to increase the saturation of said transformer core and cause a decrease of the alternating current voltage supplied to said rectifying device and therefore a decrease of the direct current voltage supplied to said control winding of said motor.

4. In a system for stabilizing the speed of an alternating current induction motor of the type having a winding energized from a source of alternating current to produce a rotating field and in which a direct current source of power connected to a control winding upon said motor is employed to vary the speed of said motor inversely to the energization of said control winding by said direct current source of power, said system comprising a rectifying device constituting said direct current source of power, a variable voltage transformer for supplying alternating current power to the input of said rectifying device, said transformer having primary and secondary windings and a control winding, a source of alternating current power for energizing said primary winding, said secondary winding surrounding the entire flux path provided by said core through said primary and connected to the input of said rectifying device, at least a portion of said control winding of said transformer being connected across the output of said rectifying device to provide a predetermined saturation of the core of said transformer, and at least a portion of said control winding of said transformer being connected in series with said control winding of said motor, whereby variations in alternating current voltages induced in said control winding of said motor vary the amount of current flowing in the control winding of said transformer to vary the saturation of said core and the alternating current voltage applied to said rectifier device to decrease the direct current voltage applied to the control winding of said motor when the speed of the motor decreases.

CHARLES P. SWEENY.